No. 667,875. Patented Feb. 12, 1901.
W. L. GARRELS & C. KIMBALL.
RUNNING GEAR FOR VEHICLES.
(Application filed Dec. 29, 1899.)
(No Model.) 2 Sheets—Sheet 2.
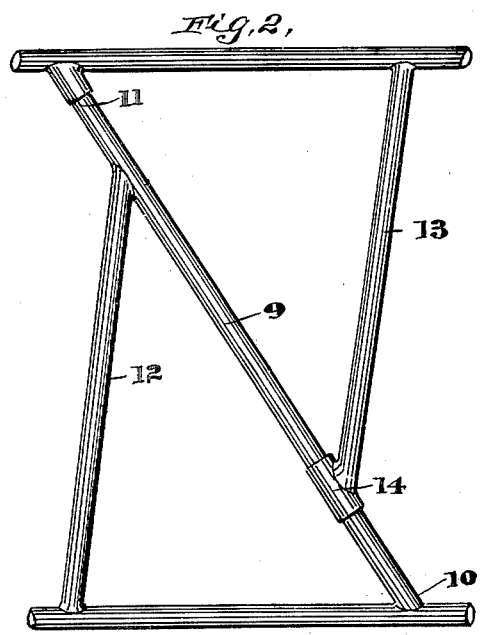
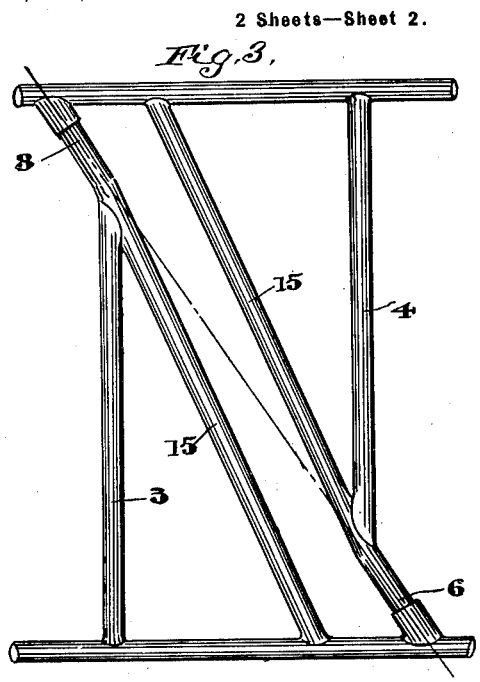
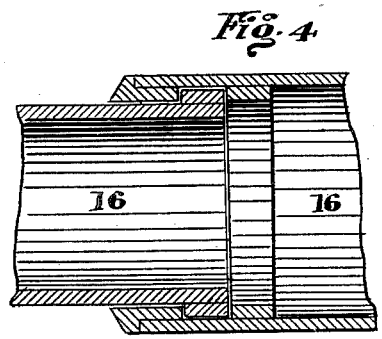
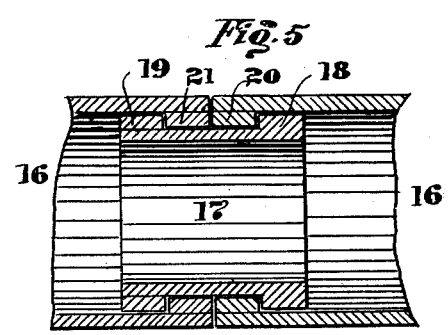
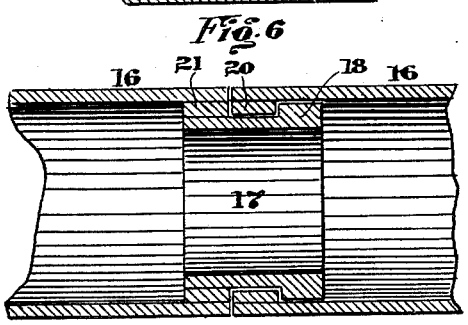
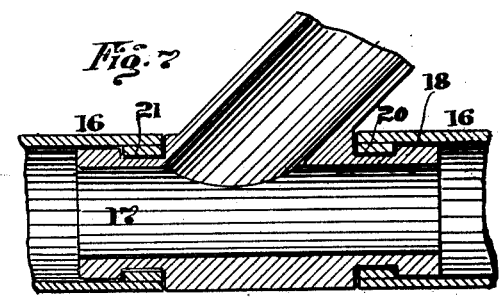
Witnesses
Paul Mehlen
A. F. Meyer
Inventors
W. L. Garrels and
Clinton Kimball
by Carr & Carr, Attys
THE NORRIS PETERS CO., PHOTO-LITHO., WASHINGTON, D. C.

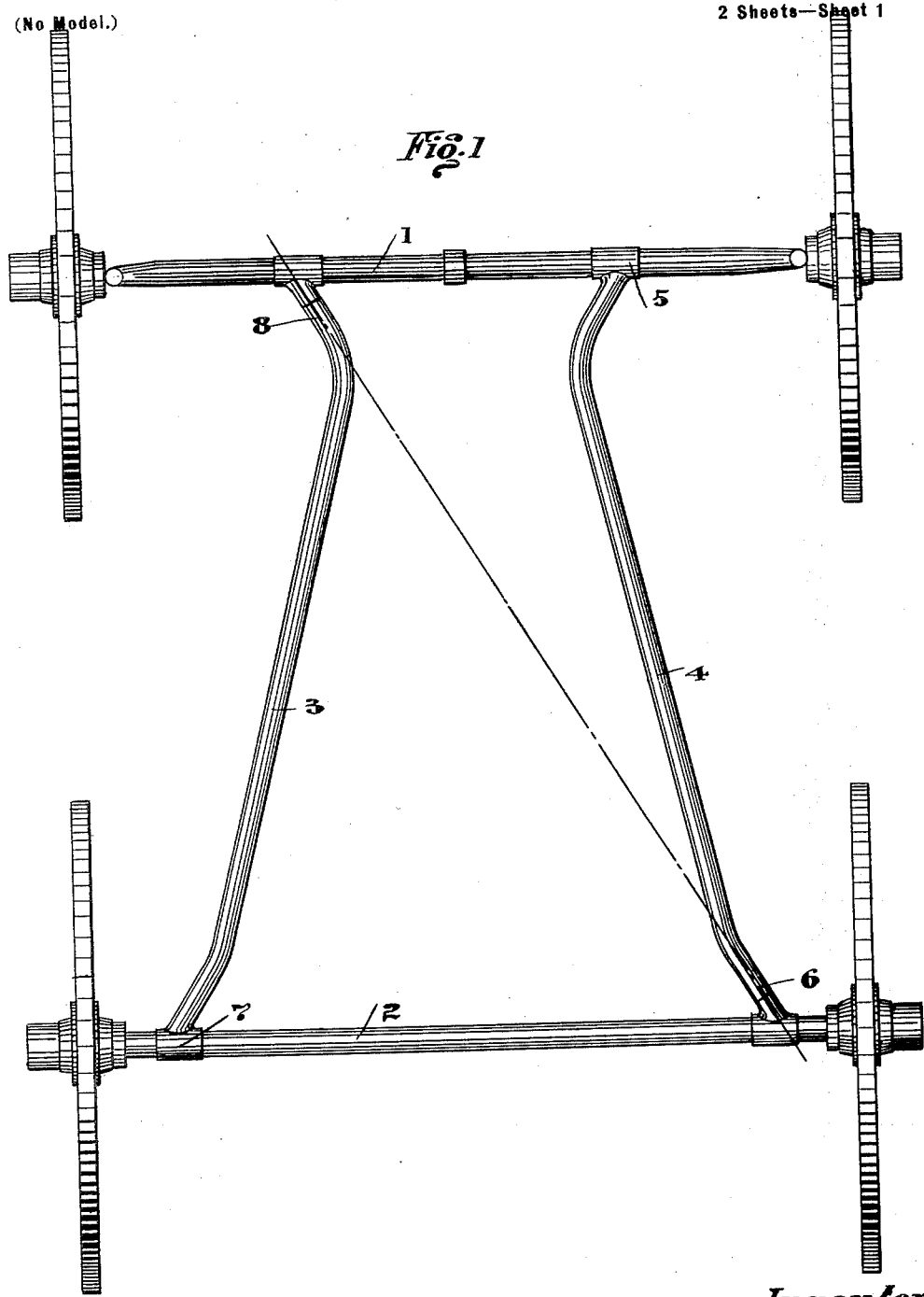

UNITED STATES PATENT OFFICE.

WILLIAM L. GARRELS, OF ST. LOUIS, AND CLINTON KIMBALL, OF KIRKWOOD, MISSOURI, ASSIGNORS TO THE ELECTRIC VEHICLE COMPANY, OF NEW YORK, N. Y., AND JERSEY CITY, NEW JERSEY.

RUNNING-GEAR FOR VEHICLES.

SPECIFICATION forming part of Letters Patent No. 667,875, dated February 12, 1901.

Application filed December 29, 1899. Serial No. 741,943. (No model.)

*To all whom it may concern:*

Be it known that we, WILLIAM L. GARRELS, residing in the city of St. Louis, and CLINTON KIMBALL, residing at Kirkwood, St. Louis county, Missouri, citizens of the United States, have invented a new and useful Improvement in Running-Gears for Vehicles, of which the following is a specification.

Our invention relates to running-gears for vehicles, and its principal object is to permit the two axles to incline in their respective vertical planes independently of each other, so as to conform to the road-bed.

Another object is to avoid the necessity of the flexing of the parts of the running-gear.

The invention consists principally in arranging the running-gear in two main portions connected together by swivel-joints arranged on a common axis.

It also consists in devices and arrangements hereinafter described and shown.

In the accompanying drawings, which form part of this specification, and wherein like symbols refer to like parts wherever they occur, Figure 1 is a plan view of our running-gear. Figs. 2 and 3 are modifications thereof; and Figs. 4, 5, 6, and 7 show several forms of swivel-joints.

The running-gear consists of a front axle or bar 1 and a rear axle or bar 2, connected together so as to be independently movable in vertical planes. In order to permit such independent vertical movement, the devices connecting such axles or bars together have swivel-joints, arranged on a common axis. At the points where the parts fixed to the front axle connect with the rear bar are parts fixed to it. Thus in the construction shown in Fig. 1 the two axles or bars are connected by two side bars 3 4. One of these side bars 4 has a rigid connection 5 to the front axle and a swivel 6 to the rear axle or bar, while the other side bar 3 has a rigid connection 7 to the rear axle or bar and a swivel connection 8 to the front axle. In order that the swivel connection can be arranged on a common axis, the portions of the swivel-joint fixed to the respective axles or bars are inclined to alinement with each other and the end portions of the side bars are inclined to correspond. By the arrangement described the left front wheel and the right rear wheel are free to swing up and down in an arc whose center is the common axis of the swivel-joint, and obviously the upward and downward movement of the right front wheel is, in effect, the same as the downward or upward movement, respectively, of the left front wheel. With relation to the two wheels on the same axle it is indifferent whether the one moves or the other. The relative movement is allowed for by the swivel connection, and thereby the running-gear conforms accurately to the road.

In the construction shown in Fig. 2 the main connecting-rod extends diagonally from one axle or bar to the other. It is connected to one axle or bar rigidly, as shown at 10, and to the other by a swivel-joint 11. A brace-rod 12 is rigidly connected to said main rod and to the axle or bar to which said main rod is rigidly connected. A second brace-rod 13 is rigidly connected to the other axle or bar and connected by a swivel-joint 14 to the main connecting-rod, the two swivel-joints being arranged along the same axis. The principal advantage of this construction over the one above described is that it provides a system of triangular bracing. It is obvious that any desired number of braces may be used, provided those rigidly connected to the axle or bar to which the main rod is swiveled shall be swiveled to the main rod.

The modification shown in Fig. 3 is the same construction as that of Fig. 1, with the addition of a brace-rod 15 for each side bar 3 4. Each brace-rod is rigidly connected to its side bar and to the axle or bar to which its side bar is connected, whereby the advantages of triangular bracing are secured for said construction.

It is noted as a characteristic of all the foregoing constructions that the running-gear is divided into two general sections whose constructional outlines are triangular, and that these sections are hinged together along a side common to the two triangles. These outlines clearly appear in the design of the running-gear shown in Fig. 2; but the constructional outline representing the theory of the other designs is the same, although in practice the intermediate portions of the bar constituting the common side are omitted.

Divers means may be used to constitute the swivel-joint, as illustrated in Figs. 4 to 7, inclusive. The forms shown in Figs. 5, 6, and 7 are adapted to form flush joints, while the form of Fig. 4 is of advantage where the space inside of the tubular rod is desired for other purposes. In the form shown in Fig. 5 the two tubular rods 16 abut endwise, and each has an internal annular flange 20 21 formed therein, preferably by a separate ring fastened therein. Extending snugly through said flanges is a collar or thimble 17, upon whose ends are rings or shoulders 18 19, adapted to fit snugly in the tubular bars and rest against the flanges thereof. The parts may be assembled as follows: The thimble is preferably formed with one shoulder 18 integral therewith, and this shoulder is fitted into one of the two. Then a ring 20 is fastened in the end of said rod; then the third ring 21 is slipped on the thimble; then the fourth ring 19 is fixed on the thimble, these inserted into the second tube, and finally the second tube and the third ring are fastened together by any suitable means.

The modification shown in Fig. 6 is the same as that above described, with the difference that the fourth ring is left out and the third ring is fixed to both the tube and the thimble. Fig. 7 is the same as Fig. 5, except that the thimble extends out between the ends of the tube forming the abutment for said ends and being fastened to a diagonal rod. This construction is especially valuable when it is desired to have the side bars swiveled to the rear bar of the frame, as we contemplate, and as shown at 7 in the drawings.

The construction shown in Fig. 4 dispenses with a separate thimble by having one tube telescope the other; but in other respects the rings interlock, as in Fig 6.

The term "swivel-joint," as used in this specification and the claims herein, is intended to include not only those joints wherein the two connected parts are in alinement with each other, but also all equivalent joints wherein the two connected parts turn or swing on a common axis, regardless of the alinement of said parts—as, for instance, in an ordinary hinge or a universal joint.

What we claim is—

1. A running-gear for vehicles, comprising two axles, and a connecting-frame composed of two triangular sections hinged together on the same oblique axial line, one of the said sections being rigid; substantially as described.

2. A running-gear for vehicles, comprising two axles or bars and side bars connecting them, and swivel-joints in said side bars, arranged in the same oblique axial line, said joints being all in the same horizontal plane; substantially as described.

3. A running-gear for vehicles, comprising two axles or bars and side bars connecting them, and swivel-joints in said side bars, interposed entirely between the axles, and arranged upon the same oblique axial line; substantially as described.

4. A running-gear for vehicles, comprising two axles, side bars connecting said axles, concentrically-arranged swivel-joints connecting the forward end of one side bar to the forward axle, and the rear end of the other bar to the rear axle, said swivel-joints being coincident to the same oblique line; substantially as described.

5. A running-gear for vehicles comprising two axles or bars and side bars connecting them, one of the side bars having a swivel-joint at or near the front axle and the other having a swivel-joint at or near the rear axle or bar, said swivel-joints being on the same axial line, and brace-rods extending from each side bar near its swivel-joint to the farther axle, substantially as described.

6. A running-gear comprising two axles or bars, bars extending from one of said axles to form a triangular frame, which frame is connected to the opposite axle or bar through a swivel-joint, and a brace rod or frame extending from the last-mentioned axle and having a swivel connection to the first-mentioned axle or a part mounted thereon, the two swivel-joints being arranged on the same axis, substantially as described.

7. A running-gear for vehicles comprising two axles or bars, bars extending from each axle to form triangular frames, and each frame being connected to the opposite axle through a swivel-joint, the two swivel-joints being arranged on the same axis, substantially as described.

8. A running-gear for vehicles comprising two axles and a connecting-frame comprising a swivel-joint, said swivel-joint consisting of a connecting-piece having annular shoulders thereon and annular shoulders on rods of the said running-gear for interlocking with said first-mentioned shoulders, substantially as described.

9. A running-gear for vehicles comprising two axles and a connecting-frame comprising a swivel-joint, said swivel-joint consisting of a shoulder on one of the parts of said running-gear and shoulders operatively mounted with reference to another rod of said running-gear on either side of said first-mentioned shoulder, substantially as described.

10. A running-gear for vehicles comprising two axles and a connecting-frame comprising a swivel-joint, said swivel-joint consisting of a connecting-piece having annular shoulders thereon and annular shoulders for interlocking therewith mounted on the rods of the running-gear to be connected, substantially as described.

W. L. GARRELS.
CLINTON KIMBALL.

Witnesses:
PAUL MEHLEN,
JAMES A. CARR.